(12) United States Patent
Tanaka et al.

(10) Patent No.: US 11,047,286 B2
(45) Date of Patent: Jun. 29, 2021

(54) EXHAUST GAS CONTROL APPARATUS FOR INTERNAL COMBUSTION ENGINE

(71) Applicant: TOYOTA JIDOSHA KABUSHIKI KAISHA, Toyota (JP)

(72) Inventors: Shogo Tanaka, Toki (JP); Norihisa Nakagawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/516,778

(22) Filed: Jul. 19, 2019

(65) Prior Publication Data
US 2020/0063630 A1 Feb. 27, 2020

(30) Foreign Application Priority Data

Aug. 22, 2018 (JP) .............................. JP2018-155556

(51) Int. Cl.
| F01N 9/00 | (2006.01) |
| F01N 3/22 | (2006.01) |
| F01N 3/035 | (2006.01) |

(52) U.S. Cl.
CPC ............. *F01N 9/00* (2013.01); *F01N 3/035* (2013.01); *F01N 3/22* (2013.01); *F01N 2560/02* (2013.01); *F01N 2560/06* (2013.01); *F01N 2900/1402* (2013.01); *F01N 2900/1404* (2013.01)

(58) Field of Classification Search
CPC combination set(s) only.
See application file for complete search history.

(56) References Cited

U.S. PATENT DOCUMENTS

| 5,551,231 A * | 9/1996 | Tanaka ................. F01N 3/0842 60/289 |
| 5,746,989 A | 5/1998 | Murachi et al. |
| 7,640,729 B2 * | 1/2010 | Durnholz ............... F01N 9/002 60/289 |

(Continued)

FOREIGN PATENT DOCUMENTS

| CN | 106321204 A | 1/2017 |
| DE | 10 2005 062 398 A1 | 6/2007 |

(Continued)

OTHER PUBLICATIONS

Mar. 17, 2020 Office Action issued in Indian Patent Application No. 201914030321.

*Primary Examiner* — Binh Q Tran
(74) *Attorney, Agent, or Firm* — Oliff PLC

(57) ABSTRACT

An exhaust gas control apparatus includes an exhaust gas control catalyst disposed in an exhaust passage, a filter disposed downstream of the catalyst, a secondary air supply device configured to supply secondary air into exhaust gas flowing into the filter at a location downstream of the catalyst in an exhaust gas flow direction, and an electronic control unit. The electronic control unit is configured to, when a temperature of the catalyst is higher than or equal to an activation temperature and an air-fuel ratio of exhaust gas emitted from an engine body is a rich air-fuel ratio, cause the supply device to supply secondary air into exhaust gas while periodically increasing or reducing the air such that the air-fuel ratio of exhaust gas flowing into the filter alternately varies between rich and lean air-fuel ratios.

16 Claims, 9 Drawing Sheets

(56) References Cited

U.S. PATENT DOCUMENTS

| | | | | |
|---|---|---|---|---|
| 9,822,689 B2* | 11/2017 | Martin | | F01N 3/30 |
| 2002/0155039 A1* | 10/2002 | Itoh | | F01N 3/0842 |
| | | | | 422/171 |
| 2009/0107121 A1 | 4/2009 | Yoshida et al. | | |
| 2009/0120070 A1* | 5/2009 | Hirata | | F01N 13/017 |
| | | | | 60/286 |
| 2010/0186386 A1* | 7/2010 | Tsujimoto | | F01N 3/0814 |
| | | | | 60/286 |
| 2018/0038254 A1 | 2/2018 | Nakada et al. | | |

FOREIGN PATENT DOCUMENTS

| | | |
|---|---|---|
| DE | 10 2015 212 514 A1 | 1/2017 |
| EP | 0 758 713 A1 | 2/1997 |
| JP | 2007-092713 A | 4/2007 |
| JP | 2010-127147 A | 6/2010 |
| WO | 2009/008395 A1 | 1/2009 |

* cited by examiner

EXHAUST GAS CONTROL APPARATUS FOR INTERNAL COMBUSTION ENGINE

INCORPORATION BY REFERENCE

The disclosure of Japanese Patent Application No. 2018-155556 filed on Aug. 22, 2018 including the specification, drawings and abstract is incorporated herein by reference in its entirety.

BACKGROUND

1. Technical Field

The present disclosure relates to an exhaust gas control apparatus for an internal combustion engine.

2. Description of Related Art

An exhaust gas control catalyst for an internal combustion engine including a secondary air supply device is known (for example, Japanese Unexamined Patent Application Publication No. 2010-127147 (JP 2010-127147 A) and Japanese Unexamined Patent Application Publication No. 2007-092713 (JP 2007-092713 A)). The secondary air supply device supplies secondary air into exhaust gas flowing through an exhaust passage of the internal combustion engine. In the exhaust gas control apparatus described in JP 2010-127147 A, a particulate filter (hereinafter, also simply referred to as filter) is provided in the exhaust passage, and the secondary air supply device is configured to supply secondary air into exhaust gas flowing into the filter.

In the thus configured exhaust gas control apparatus described in JP 2010-127147 A, when the amount of particulate matter (hereinafter, also referred to as PM) deposited on the filter increases, secondary air is supplied while the air-fuel ratio of exhaust gas that is emitted from an engine body is kept at an air-fuel ratio richer than a stoichiometric air-fuel ratio (hereinafter, also referred to as rich air-fuel ratio). Thus, the secondary air reacts with unburnt fuel contained in the rich air-fuel ratio exhaust gas on the filter to raise the temperature of the filter, with the result that the PM is burnt and removed.

SUMMARY

Incidentally, it is known that $NO_2$ contained in exhaust gas is more reactive with PM than oxygen. For this reason, when exhaust gas containing a large amount of $NO_2$ is caused to flow into the filter, the amount of PM removed can be increased. However, in the exhaust gas control apparatus described in JP 2010-127147 A, gas composed of rich air-fuel ratio exhaust gas with a small amount of $NO_2$ and added secondary air directly flows into the filter. Therefore, $NO_2$ is not so contained in the exhaust gas flowing into the filter, so the burning rate of PM is not increased.

On the other hand, as a method of causing exhaust gas containing a large amount of $NO_2$ to flow into the filter, it is conceivable that the air-fuel ratio of exhaust gas that is emitted from the engine body is set to a lean air-fuel ratio and an oxidation catalyst is provided upstream of the filter in an exhaust gas flow direction. Thus, part of NO in exhaust gas emitted from the engine body is converted into $NO_2$ by the oxidation catalyst, the $NO_2$ is caused to flow into the filter, and PM deposited on the filter is burnt with the $NO_2$.

However, not only $NO_2$ but also NO is contained in lean air-fuel ratio exhaust gas flowing into the filter in this case. When the NO flows into the filter, the NO flows out from the filter without reacting with PM. Therefore, when the lean air-fuel ratio exhaust gas is continuously caused to flow into the filter, emissions of exhaust gas flowing out from the filter deteriorate.

The disclosure provides an exhaust gas control apparatus that is able to reduce deterioration of emissions while facilitating removal of PM from a filter.

A first aspect of the disclosure relates to an exhaust gas control apparatus for an internal combustion engine. The exhaust gas control apparatus includes an exhaust gas control catalyst, a particulate filter, an oxygen supply device, and an electronic control unit. The exhaust gas control catalyst is disposed in an exhaust passage of the internal combustion engine. The exhaust gas control catalyst has a catalytic function. The particulate filter is disposed in the exhaust passage at a location downstream of the exhaust gas control catalyst in an exhaust gas flow direction. The oxygen supply device is configured to supply gas containing oxygen into exhaust gas flowing into the particulate filter at a location downstream of the exhaust gas control catalyst in the exhaust gas flow direction. The electronic control unit is configured to regulate an amount of oxygen that is supplied from the oxygen supply device. When a temperature of the exhaust gas control catalyst falls within a predetermined temperature range higher than or equal to an activation temperature and an air-fuel ratio of exhaust gas emitted from a body of the internal combustion engine is a rich air-fuel ratio richer than a stoichiometric air-fuel ratio, the electronic control unit is configured to cause the oxygen supply device to supply oxygen into the exhaust gas while periodically increasing or reducing the oxygen such that an air-fuel ratio of exhaust gas flowing into the particulate filter alternately varies between the rich air-fuel ratio and a lean air-fuel ratio leaner than the stoichiometric air-fuel ratio.

In the exhaust gas control apparatus, the predetermined temperature range may be higher than or equal to 400° C. and lower than or equal to 600° C.

A second aspect of the disclosure relates to an exhaust gas control apparatus for an internal combustion engine. The exhaust gas control apparatus includes an exhaust gas control catalyst, a particulate filter, an oxygen supply device, and an electronic control unit. The exhaust gas control catalyst is disposed in an exhaust passage of the internal combustion engine. The exhaust gas control catalyst has a catalytic function. The particulate filter is disposed in the exhaust passage at a location downstream of the exhaust gas control catalyst in an exhaust gas flow direction. The oxygen supply device is configured to supply gas containing oxygen into exhaust gas flowing into the particulate filter at a location downstream of the exhaust gas control catalyst in the exhaust gas flow direction. The electronic control unit is configured to regulate an amount of oxygen that is supplied from the oxygen supply device. Under a condition that hydrogen or ammonia is produced in the exhaust gas control catalyst when an air-fuel ratio of exhaust gas emitted from a body of the internal combustion engine is a rich air-fuel ratio richer than a stoichiometric air-fuel ratio, the electronic control unit is configure to cause the oxygen supply device to supply oxygen into the exhaust gas while periodically increasing or reducing the oxygen such that an air-fuel ratio of exhaust gas flowing into the particulate filter alternately varies between the rich air-fuel ratio and a lean air-fuel ratio leaner than the stoichiometric air-fuel ratio.

A third aspect of the disclosure relates to an exhaust gas control apparatus for an internal combustion engine. The exhaust gas control apparatus includes a particulate filter, an oxygen supply device, and an electronic control unit. The particulate filter is disposed in an exhaust passage of the internal combustion engine. The oxygen supply device is configured to supply gas containing oxygen into exhaust gas flowing into the particulate filter. The electronic control unit is configured to regulate an amount of oxygen that is supplied from the oxygen supply device. Under a condition that $NO_2$ is produced with oxygen supplied from the oxygen supply device when oxygen that is supplied from the oxygen supply device into exhaust gas is periodically increased or reduced such that an air-fuel ratio of exhaust gas flowing into the particulate filter alternately varies between a rich air-fuel ratio richer than a stoichiometric air-fuel ratio and a lean air-fuel ratio leaner than the stoichiometric air-fuel ratio, the electronic control unit is configured to cause the oxygen supply device to supply oxygen into the exhaust gas while periodically increasing or reducing the oxygen such that an air-fuel ratio of exhaust gas flowing into the particulate filter alternately varies between the rich air-fuel ratio and the lean air-fuel ratio.

In the exhaust gas control apparatus, the electronic control unit may be configured to cause the oxygen supply device to supply oxygen into the exhaust gas while periodically increasing or reducing the oxygen such that an average air-fuel ratio in a plurality of cycles in which an air-fuel ratio of exhaust gas flowing into the particulate filter alternately varies between the rich air-fuel ratio and the lean air-fuel ratio becomes the stoichiometric air-fuel ratio.

In the exhaust gas control apparatus, the electronic control unit may be configured to increase a leanness degree at the time when the air-fuel ratio of exhaust gas flowing into the particulate filter is the leanest as a temperature of the particulate filter decreases.

In the exhaust gas control apparatus, the electronic control unit may be configured to cause the oxygen supply device to supply oxygen into the exhaust gas while periodically increasing or reducing the oxygen such that the air-fuel ratio of exhaust gas flowing into the particulate filter alternately varies between the rich air-fuel ratio and the lean air-fuel ratio with a period shorter than or equal to a period with which exhaust gas having the lean air-fuel ratio flows into the particulate filter before exhaust gas having the rich air-fuel ratio and having flowed into the particulate filter flows out from the particulate filter and exhaust gas having the rich air-fuel ratio flows into the particulate filter before exhaust gas having the lean air-fuel ratio and having flowed into the particulate filter flows out from the particulate filter.

In the exhaust gas control apparatus, the particulate filter may have a catalytic function.

According to the aspects of the disclosure, an exhaust gas control apparatus that reduces deterioration of emissions while facilitating removal of PM in a filter is provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
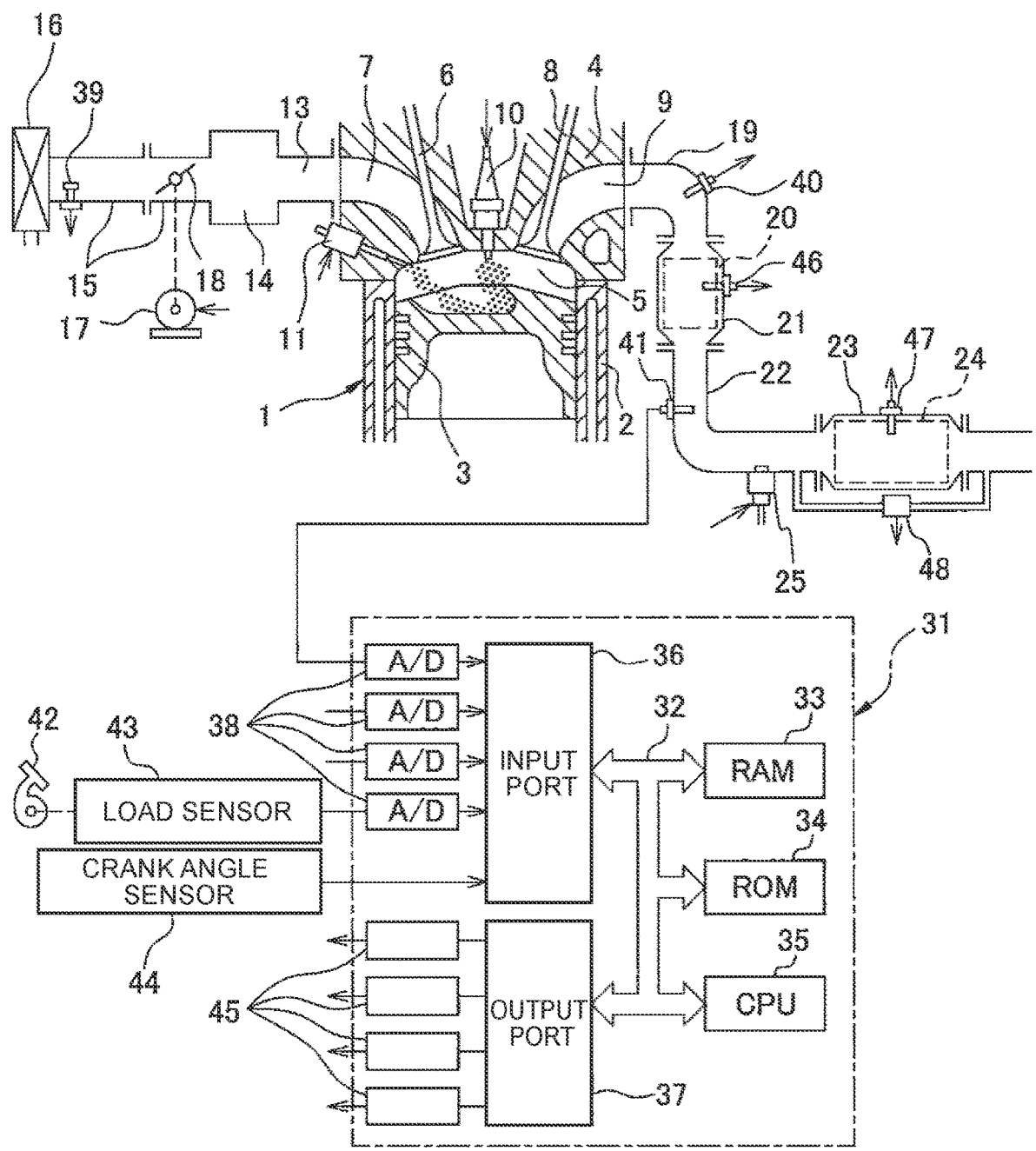
FIG. 1 is a view schematically showing an internal combustion engine in which an exhaust gas control apparatus according to a first embodiment is used.

Hereinafter, embodiments of the disclosure will be described in detail with reference to the accompanying drawings. In the following description, like reference numerals denote similar components.

First Embodiment

Overall Description of Internal Combustion Engine

FIG. 1 is a view schematically showing an internal combustion engine in which an exhaust gas control apparatus according to a first embodiment is used. As shown in FIG. 1, the reference numeral 1 denotes an engine body, the reference numeral 2 denotes a cylinder block, the reference numeral 3 denotes a piston that reciprocates inside the cylinder block 2, the reference numeral 4 denotes a cylinder head fixed onto the cylinder block 2, the reference numeral 5 denotes a combustion chamber defined between the piston 3 and the cylinder head 4, the reference numeral 6 denotes an intake valve, the reference numeral 7 denotes an intake port, the reference numeral 8 denotes an exhaust valve, and the reference numeral 9 denotes an exhaust port. The intake valve 6 opens or closes the intake port 7. The exhaust valve 8 opens or closes the exhaust port 9.

As shown in FIG. 1, an ignition plug 10 is disposed at the center of an inner wall surface of the cylinder head 4, and a fuel injection valve 11 is disposed at an inner wall surface peripheral portion of the cylinder head 4. The ignition plug 10 is configured to generate spark in response to an ignition signal. The fuel injection valve 11 injects a predetermined amount of fuel into the combustion chamber 5 in response to an injection signal. The fuel injection valve 11 may be disposed so as to inject fuel into the intake port 7. In the present embodiment, gasoline having a stoichiometric air-fuel ratio of 14.6 is used as a fuel. Alternatively, a fuel other than gasoline or gasoline-mixed fuel may be used in the internal combustion engine in which the exhaust gas control apparatus according to the disclosure is used.

The intake port 7 of each cylinder is coupled to a surge tank 14 via a corresponding one of intake branch pipes 13. The surge tank 14 is coupled to an air cleaner 16 via an intake pipe 15. The intake ports 7, the intake branch pipes 13, the surge tank 14, and the intake pipe 15 form an intake passage. A throttle valve 18 is disposed in the intake pipe 15.

The throttle valve 18 is actuated by a throttle valve actuator 17. The throttle valve 18 is able to change the opening area of the intake passage when the throttle valve 18 is turned by the throttle valve actuator 17.

On the other hand, the exhaust port 9 of each cylinder is coupled to an exhaust manifold 19. The exhaust manifold 19 includes a plurality of branch portions respectively coupled to the exhaust ports 9, and a collecting portion that collects these branch portions. The collecting portion of the exhaust manifold 19 is coupled to an upstream-side casing 21. An exhaust gas control catalyst 20 is incorporated in the upstream-side casing 21. The upstream-side casing 21 is coupled to a downstream-side casing 23 via an exhaust pipe 22. A particulate filter (hereinafter, also simply referred to as filter) 24 is incorporated in the downstream-side casing 23. A secondary air supply device 25 is provided in the exhaust pipe 22 between the exhaust gas control catalyst 20 and the filter 24. The secondary air supply device 25 supplies secondary air into exhaust gas flowing through the exhaust pipe 22, that is, exhaust gas flowing into the filter 24. The exhaust ports 9, the exhaust manifold 19, the upstream-side casing 21, the exhaust pipe 22, and the downstream-side casing 23 form an exhaust passage.

The exhaust gas control apparatus of the present embodiment includes the secondary air supply device 25. Instead, the exhaust gas control apparatus may include another oxygen supply device as long as the oxygen supply device is able to supply gas containing oxygen into exhaust gas flowing into the filter 24. Specific examples of the oxygen supply device include a device that supplies only oxygen into exhaust gas.

An electronic control unit (ECU) 31 is a digital computer, and includes a random access memory (RAM) 33, a read only memory (ROM) 34, a microprocessor (CPU) 35, an input port 36, and an output port 37 connected to one another via a bidirectional bus 32.

An air flow meter 39 is disposed in the intake pipe 15. The air flow meter 39 is used to detect the flow rate of air flowing through the intake pipe 15. An output signal of the air flow meter 39 is input to the input port 36 via an associated AD converter 38. An upstream-side air-fuel ratio sensor 40 is disposed at the collecting portion of the exhaust manifold 19. The upstream-side air-fuel ratio sensor 40 detects the air-fuel ratio of exhaust gas flowing through the exhaust manifold 19 (that is, exhaust gas flowing into the exhaust gas control catalyst 20). In addition, a downstream-side air-fuel ratio sensor 41 is disposed in the exhaust pipe 22. The downstream-side air-fuel ratio sensor 41 detects the air-fuel ratio of exhaust gas flowing through the exhaust pipe 22 (that is, exhaust gas flowing out from the exhaust gas control catalyst 20 and flowing into the filter 24). Output signals of the air-fuel ratio sensors 40, 41 are also input to the input port 36 via associated AD converters 38.

The exhaust gas control catalyst 20 is provided with a catalyst temperature sensor 46. The catalyst temperature sensor 46 is used to detect the temperature of the exhaust gas control catalyst 20. The filter 24 is provided with a filter temperature sensor 47. The filter temperature sensor 47 is used to detect the temperature of the filter 24. A differential pressure sensor 48 is provided between the exhaust pipe 22 upstream of the filter 24 and the exhaust pipe 22 downstream of the filter 24. The differential pressure sensor 48 is used to detect the differential pressure between the upstream side and downstream side of the filter 24. Output signals of the temperature sensors 46, 47 and differential pressure sensor 48 are also input to the input port 36 via associated AD converters 38.

A load sensor 43 is connected to an accelerator pedal 42. The load sensor 43 generates an output voltage proportional to a depression amount of the accelerator pedal 42. An output voltage of the load sensor 43 is input to the input port 36 via an associated AD converter 38. A crank angle sensor 44 generates an output pulse, for example, each time a crankshaft rotates 15 degrees. The output pulse is input to the input port 36. The CPU 35 calculates an engine rotation speed based on the output pulse of the crank angle sensor 44.

On the other hand, the output port 37 is connected to the ignition plugs 10, the fuel injection valves 11, the throttle valve actuator 17, and the secondary air supply device 25 via associated driving circuits 45. Therefore, the ECU 31 functions as a controller that controls the operations of the ignition plugs 10, fuel injection valves 11, throttle valve actuator 17, and secondary air supply device 25.

In the present embodiment, the exhaust gas control catalyst 20 is a three-way catalyst in which catalytic precious metal (for example, platinum (Pt)) having a catalysis is supported on a carrier made of ceramics. A three-way catalyst has a function of removing unburnt HC, CO, and NOx at the same time when the air-fuel ratio of exhaust gas flowing into the three-way catalyst is kept at the stoichiometric air-fuel ratio. The exhaust gas control catalyst 20 may be a catalyst other than the three-way catalyst, such as an oxidation catalyst and an NOx storage-reduction catalyst, as long as the catalyst has a structure that a substance having a catalysis is supported.

Figure 2A:
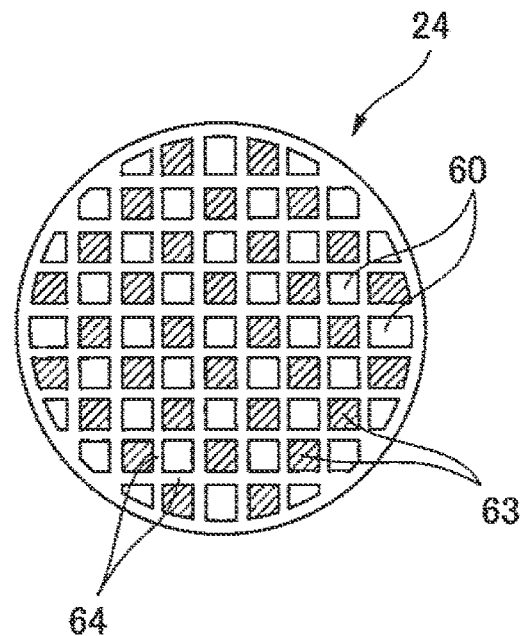
FIG. 2A is a front view of a filter.
Figure 2B:
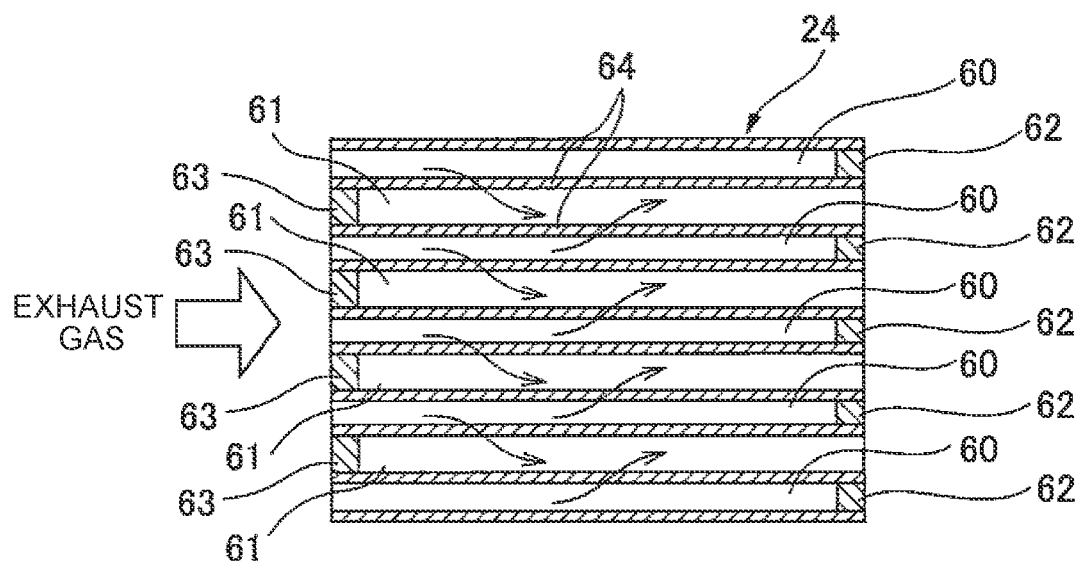
FIG. 2B is a longitudinal sectional view of the filter.

FIG. 2A and FIG. 2B are views showing the structure of the filter 24. FIG. 2A is a front view of the filter 24. FIG. 2B is a longitudinal cross-sectional view of the filter 24. As shown in FIG. 2A and FIG. 2B, the filter 24 has a honeycomb structure, and has a plurality of exhaust gas flow passages 60, 61 extending parallel to each other. These exhaust gas flow passages include exhaust gas inflow passages 60 and exhaust gas outflow passages 61. The downstream end of each exhaust gas inflow passage 60 is closed by a plug 62. The upstream end of each exhaust gas outflow passage 61 is closed by a plug 63. In FIG. 2A, the hatched portions represent the plugs 63. Therefore, the exhaust gas inflow passage 60 and the exhaust gas outflow passage 61 are disposed alternately via a thin partition wall 64. In other words, the exhaust gas inflow passages 60 and the exhaust gas outflow passages 61 are disposed such that each exhaust gas inflow passage 60 is surrounded by the four exhaust gas outflow passages 61 and each exhaust gas outflow passage 61 is surrounded by the four exhaust gas inflow passages 60.

The filter 24 is made of a porous material, such as cordierite. Therefore, exhaust gas flowing into the exhaust gas inflow passage 60 passes through the surrounding partition walls 64 as represented by the arrows in FIG. 2B, and flows out to the adjacent exhaust gas outflow passages 61. In this way, while exhaust gas is flowing through the partition walls 64, PM contained in the exhaust gas is trapped by the filter 24.

The filter 24 has supported catalytic precious metal (such as platinum (Pt)) having a catalysis. That is, the filter 24 has a catalytic function. Therefore, the filter 24 is able to not only trap PM contained in exhaust gas but also oxidize and remove unburnt HC and CO contained in exhaust gas. The filter 24 may have another configuration as long as the filter 24 has a supported substance that traps PM contained in exhaust gas and that has a catalysis. Furthermore, when an exhaust gas control catalyst having a catalysis is disposed between the secondary air supply device 25 and the filter 24, the filter 24 does not need to have a supported substance having a catalysis.

Filter Regeneration Process

PM trapped in the filter 24 deposits on the filter 24. When the amount of PM deposited on the filter 24 increases, pores in the partition walls 64 clog, with the result that a pressure loss of exhaust gas due to the filter 24 increases. An increase in pressure loss leads to a decrease in output power and deterioration of combustion of the internal combustion engine resulting from difficulty of exhaust gas flow. Therefore, to prevent a decrease in output power and deterioration of combustion of the internal combustion engine, when the amount of PM deposited on the filter 24 is greater than a limit deposition amount, PM deposited on the filter 24 needs to be oxidized and removed. A limit deposition amount is an amount as follows. When the amount of PM deposited on the filter 24 increases to the limit deposition amount or above, a pressure loss due to the filter 24 increases, leading to, for example, deterioration of the operating state of the internal combustion engine.

Figure 3A:
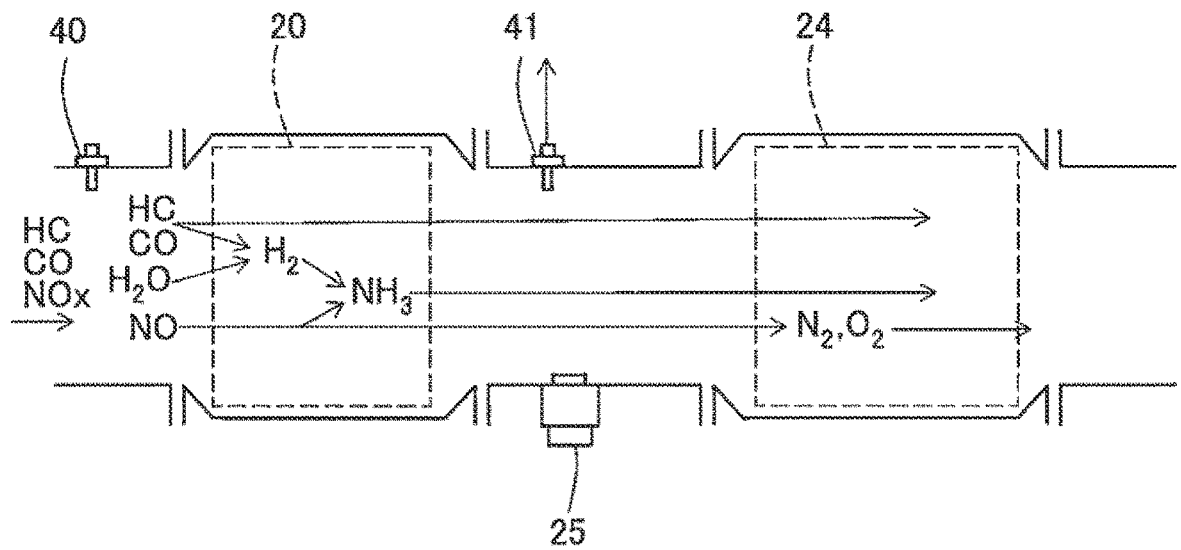
FIG. 3A is a view schematically showing reactions that take place in an exhaust gas control apparatus when a filter regeneration process is performed.
Figure 3B:
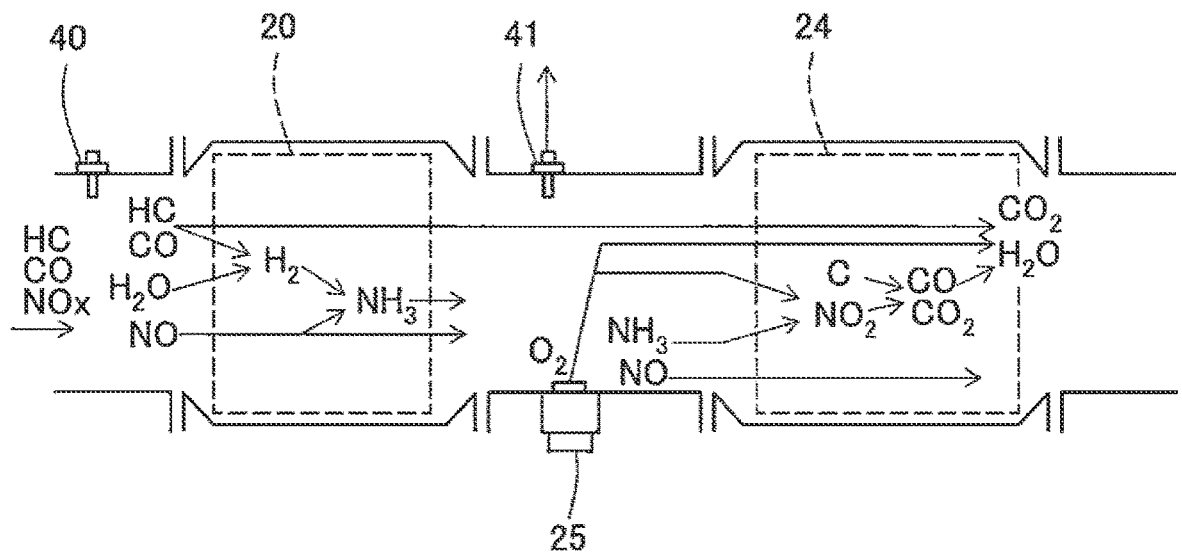
FIG. 3B is a view schematically showing reactions that take place in the exhaust gas control apparatus when the filter regeneration process is performed.

In the present embodiment, when the amount of PM deposited on the filter 24 has increased, a filter regeneration process is performed to oxidize and remove PM. Hereinafter, the filter regeneration process will be described with reference to FIG. 3A and FIG. 3B. FIG. 3A and FIG. 3B are views schematically showing reactions that take place in the exhaust gas control apparatus when the filter regeneration process is performed. FIG. 3A shows the case where no secondary air is being supplied from the secondary air supply device 25. FIG. 3B shows the case where secondary air is being supplied from the secondary air supply device 25.

In performing the filter regeneration process, initially, the temperature of the exhaust gas control catalyst 20 is raised to its activation temperature or higher. Specifically, the temperature of the exhaust gas control catalyst 20 is raised to 300° C. or higher and 700° C. or lower, and is preferably raised to 400° C. or higher and 600° C. or lower.

In addition, in the present embodiment, in performing the filter regeneration process, a fuel injection amount from each fuel injection valve 11 is regulated such that the air-fuel ratio of exhaust gas that is emitted from the engine body 1 becomes an air-fuel ratio richer than the stoichiometric air-fuel ratio (hereinafter, also referred to as rich air-fuel ratio). In other words, in performing the filter regeneration process, the fuel injection amount is regulated such that the air-fuel ratio of exhaust gas flowing into the exhaust gas control catalyst 20 becomes the rich air-fuel ratio. As a result, during the filter regeneration process, exhaust gas having the rich air-fuel ratio flows into the exhaust gas control catalyst 20.

Unburnt HC and CO are contained in exhaust gas having the rich air-fuel ratio. In addition, since water is produced as a result of combustion of air-fuel mixture in each combustion chamber 5, water is contained in exhaust gas. Therefore, exhaust gas containing unburnt HC and CO and water flows into the exhaust gas control catalyst 20.

When the temperature of the exhaust gas control catalyst 20 falls within the range of 300° C. to 500° C., as exhaust gas containing CO and water flows into the exhaust gas control catalyst 20, the water gas shift reaction expressed by the following formula (1) takes place in the exhaust gas control catalyst 20 under the catalysis of the exhaust gas control catalyst 20.

$$CO+H_2O \rightarrow H_2+CO_2 \quad (1)$$

When the temperature of the exhaust gas control catalyst 20 is higher than or equal to 500° C., as exhaust gas containing unburnt HC and water flows into the exhaust gas control catalyst 20, the steam-reforming reaction expressed by the following formula (2) or formula (3) takes place in the exhaust gas control catalyst 20 under the catalysis of the exhaust gas control catalyst 20.

$$CH_4+H_2O \rightarrow 3H_2+CO \quad (2)$$

$$C_{12}H_{26}+12H_2O \rightarrow 25H_2+12CO \quad (3)$$

Therefore, when the temperature of the exhaust gas control catalyst 20 is higher than or equal to the activation temperature (for example, 300° C.), as exhaust gas having the rich air-fuel ratio flows into the exhaust gas control catalyst 20, hydrogen is produced in the exhaust gas control catalyst 20.

Even when the air-fuel ratio of exhaust gas emitted from the engine body 1 is the rich air-fuel ratio, NOx (mainly, NO) is contained in the exhaust gas. When the temperature of the exhaust gas control catalyst 20 is relatively high, NO contained in exhaust gas in this way reacts with hydrogen into ammonia as expressed by the following formula (4) in the exhaust gas control catalyst 20 under the catalysis of the exhaust gas control catalyst 20. This reaction particularly tends to take place when the temperature of the exhaust gas control catalyst 20 falls within the range of 400° C. to 600° C.

$$2NO+5H_2 \rightarrow 2NH_3+2H_2O \quad (4)$$

Therefore, when the temperature of the exhaust gas control catalyst 20 is higher than or equal to the activation temperature (particularly, the range of 400° C. to 600° C.), as exhaust gas having the rich air-fuel ratio flows into the exhaust gas control catalyst 20, exhaust gas having the rich air-fuel ratio and containing ammonia flows out from the exhaust gas control catalyst 20.

Figure 4:
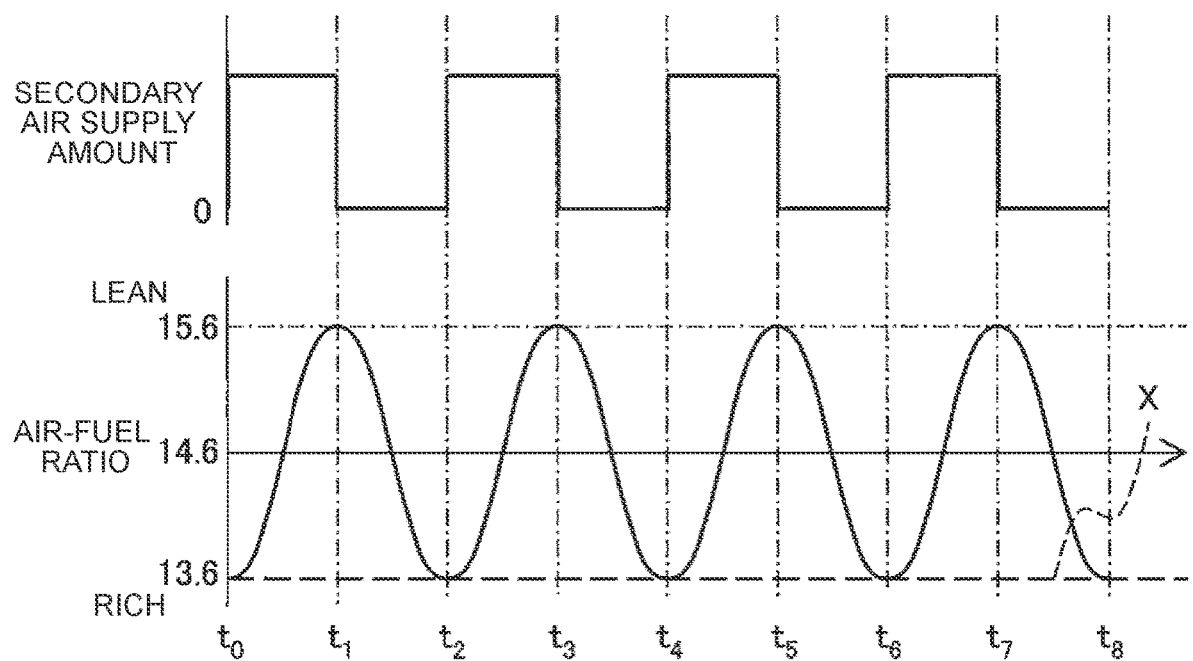
FIG. 4 is a timing chart of the amount of secondary air supplied from a secondary air supply device and the air-fuel ratio of exhaust gas flowing into the filter.

In addition, in the present embodiment, in performing the filter regeneration process, secondary air is intermittently supplied from the secondary air supply device 25. FIG. 4 is a timing chart of the amount of secondary air supplied from the secondary air supply device 25, and the air-fuel ratio of exhaust gas flowing into the filter 24. The dashed line X in FIG. 4 represents the air-fuel ratio of exhaust gas before secondary air is supplied (in the illustrated example, the air-fuel ratio at this time is 13.6).

As shown in FIG. 4, in the present embodiment, secondary air is intermittently supplied from the secondary air supply device 25. In the example shown in FIG. 4, a constant amount of secondary air is supplied from time $t_0$ to time $t_1$, from time $t_2$ to time $t_3$, from time $t_4$ to time $t_5$, and from time $t_6$ to time $t_7$. Particularly, in the present embodiment, secondary air is intermittently supplied such that a duration (for example, from time $t_0$ to time $t_1$) during which secondary air is being supplied is equal to a duration (for example, from time $t_1$ to time $t_2$) during which supply of secondary air is stopped (hereinafter, this duration is also referred to as period).

Particularly, in the present embodiment, the switching period of supply of secondary air is set to at or below a duration during which exhaust gas having a lean air-fuel ratio flows into the filter 24 before exhaust gas having the rich air-fuel ratio and having flowed into the filter 24 flows out from the filter 24 Preferably, the switching period of supply of secondary air is set to at or below a duration during which exhaust gas having the lean air-fuel ratio flows into the filter 24 before exhaust gas having the rich air-fuel ratio and having flowed into the filter 24 reaches a center of the filter 24 in the exhaust gas flow direction.

Similarly, the switching period of supply of secondary air is set to at or below a duration during which exhaust gas having the rich air-fuel ratio flows into the filter 24 before exhaust gas having the lean air-fuel ratio and having flowed into the filter 24 flows out from the filter 24. Preferably, the switching period of supply of secondary air is set to at or below a duration during which exhaust gas having the rich air-fuel ratio flows into the filter 24 before exhaust gas having the rich air-fuel ratio and having flowed into the filter 24 reaches a center of the filter 24 in the exhaust gas flow direction. Specifically, the switching period of supply of secondary air is set to, for example, about 10 Hz.

As a result of supply of secondary air from the secondary air supply device 25 in this way, the air-fuel ratio of exhaust gas that flows into the filter 24 varies alternately between the rich air-fuel ratio and an air-fuel ratio leaner than the stoichiometric air-fuel ratio (hereinafter, also referred to as lean air-fuel ratio) as shown in FIG. 4. Particularly, in the present embodiment, secondary air is intermittently supplied such that a richness degree (for example, a richness degree at time $t_0$, time $t_2$, time $t_4$, or the like) at which the air-fuel ratio of exhaust gas flowing into the filter 24 is the richest is equal to a leanness degree (for example, a leanness degree at time $t_1$, time $t_3$, time $t_5$, or the like) at which the air-fuel ratio of exhaust gas flowing into the filter 24 is the leanest.

As a result, in the present embodiment, an average air-fuel ratio of exhaust gas flowing into the filter 24 over a certain length of time is almost the stoichiometric air-fuel ratio. That is, in the present embodiment, an average air-fuel ratio over multiple cycles in which the air-fuel ratio of exhaust gas flowing into the filter 24 varies alternately between the rich air-fuel ratio and the lean air-fuel ratio is almost the stoichiometric air-fuel ratio.

In the present embodiment, secondary air is supplied such that a richness degree at the time when the air-fuel ratio of exhaust gas is the richest is equal to a leanness degree at the time when the air-fuel ratio of exhaust gas is the leanest. However, these richness degree and leanness degree do not always need to be equal to each other. Secondary air may be supplied such that any one of the leanness degree and the richness degree is higher than the other. In the present embodiment, secondary air is supplied such that the duration during which secondary air is being supplied is equal to the duration during which supply of secondary air is stopped. However, these durations do not always need to be equal to each other. Secondary air may be supplied such that any one of the durations is longer than the other. In the present embodiment, secondary air is supplied such that the average air-fuel ratio of exhaust gas flowing into the filter 24 is almost the stoichiometric air-fuel ratio. Instead, secondary air may be supplied such that the average air-fuel ratio of exhaust gas flowing into the filter 24 is the rich air-fuel ratio or the lean air-fuel ratio.

FIG. 3A shows the reactions that take place in the exhaust gas control apparatus when no secondary air is being supplied from the secondary air supply device 25. As is apparent from FIG. 3A, unburnt HC and CO contained in exhaust gas emitted from the engine body 1 flow into the filter 24, and ammonia produced in the exhaust gas control catalyst 20 also flows into the filter 24.

Part of NOx contained in exhaust gas emitted from the engine body 1 also remains without being removed in the exhaust gas control catalyst 20. Therefore, NOx also flows into the filter 24. NOx having flowed into the filter 24 is reduced and removed by unburnt HC or CO under the action of the supported catalytic precious metal in the filter 24. Therefore, when no secondary air is being supplied, exhaust gas containing unburnt HC, CO, and ammonia flows to the downstream side of the filter 24.

On the other hand, FIG. 3B shows the reactions that take place in the exhaust gas control apparatus when secondary air is being supplied from the secondary air supply device 25. In a region upstream of a region where the secondary air supply device 25 is provided, similar reactions to those in the case where no secondary air is being introduced take place. Therefore, exhaust gas flowing into the filter 24 contains unburnt HC, CO, ammonia, and NOx (particularly, NO). In addition, when secondary air is being supplied, exhaust gas flowing into the filter 24 contains air, particularly, oxygen, supplied from the secondary air supply device 25.

When the temperature of the filter 24 is higher than or equal to 300° C. at this time, $NO_2$ is produced from ammonia and oxygen through the reaction expressed by the following formula (5) on the filter 24 having supported catalytic precious metal.

$$4NH_3 + 5O_2 \rightarrow 4NO_2 + 6H_2O \qquad (5)$$

$NO_2$ produced in this way is more reactive with PM deposited on the filter 24 than oxygen. Therefore, when the temperature of the filter 24 is about 300° C., $NO_2$ oxidizes and removes PM (containing carbon C as a main ingredient) through the reaction expressed by the following formulae (6) to (9).

$$2NO_2 + 2C \rightarrow 2CO_2 + N_2 \qquad (6)$$

$$NO_2 + C \rightarrow CO + NO \qquad (7)$$

$$O_2 + C \rightarrow CO_2 \qquad (8)$$

$$O_2 + 2C \rightarrow 2CO \qquad (9)$$

When secondary air is being supplied, unburnt HC and CO contained in exhaust gas emitted from the exhaust gas control catalyst 20 react with supplied oxygen on the filter 24, so unburnt HC and CO are removed. Similarly, CO produced in the above formula (7) and formula (9) also reacts with supplied oxygen and is removed. On the other hand, NO contained in exhaust gas emitted from the exhaust gas control catalyst 20 is not removed and remains because of a lean atmosphere caused by supply of secondary air. Therefore, when secondary air is being supplied, exhaust gas containing NO flows into the region downstream of the filter 24.

As described with reference to FIG. 2A and FIG. 2B, exhaust gas flows through the thin partition walls 64 in the filter 24. In the present embodiment, the air-fuel ratio of exhaust gas flowing into the filter 24 alternately varies between the rich air-fuel ratio and the lean air-fuel ratio with a relatively short period. As a result, even when exhaust gas having the rich air-fuel ratio and exhaust gas having the lean air-fuel ratio alternately flow in at the inlet of the filter 24, these exhaust gases are mixed with each other at the outlet of the filter 24.

As described above, when no secondary air is being supplied, exhaust gas containing unburnt HC, CO, and ammonia flows into the region downstream of the filter 24. On the other hand, when secondary air is being supplied, exhaust gas containing NO or oxygen flows into the region downstream of the filter 24. These exhaust gases mix with each other in the region downstream of the filter 24, so unburnt HC, CO, and ammonia react with NO and oxygen. As a result, unburnt HC, CO, ammonia, and NO are removed.

As described above, in the present embodiment, when secondary air is being supplied, exhaust gas containing a large amount of $NO_2$ flows into the filter 24, so removal of PM deposited on the filter 24 is facilitated. In addition, in the present embodiment, exhaust gas having the rich air-fuel ratio and exhaust gas having the lean air-fuel ratio are caused to alternately flow into the filter 24 with a short period, so unburnt HC, CO, NO, and other substances, in exhaust gas are removed. Thus, deterioration of exhaust emissions is reduced.

In summary, in the present embodiment, when the temperature of the exhaust gas control catalyst 20 falls within a predetermined temperature range higher than or equal to the activation temperature and the air-fuel ratio of exhaust gas emitted from the engine body 1 is the rich air-fuel ratio, secondary air (oxygen) is supplied from the secondary air supply device 25 into the exhaust gas while being periodically increased or reduced such that the air-fuel ratio of exhaust gas flowing into the filter 24 alternately varies between the rich air-fuel ratio and the lean air-fuel ratio.

From another viewpoint, in the present embodiment, under the condition that hydrogen or ammonia is produced in the exhaust gas control catalyst 20 when the air-fuel ratio of exhaust gas emitted from the engine body 1 is the rich air-fuel ratio, secondary air (oxygen) is supplied from the secondary air supply device 25 into the exhaust gas while being periodically increased or reduced such that the air-fuel ratio of exhaust gas flowing into the filter 24 alternately varies between the rich air-fuel ratio and the lean air-fuel ratio.

From further another viewpoint, in the present embodiment, under the condition that $NO_2$ is produced by secondary air (oxygen) supplied from the secondary air supply device 25 when oxygen that is supplied from the secondary air supply device 25 into exhaust gas is periodically increased or reduced such that the air-fuel ratio of exhaust gas flowing into the filter 24 alternately varies between the rich air-fuel ratio and the lean air-fuel ratio, secondary air (oxygen) is supplied from the secondary air supply device 25 into the exhaust gas while being periodically increased or reduced such that the air-fuel ratio of exhaust gas flowing into the filter 24 alternately varies between the rich air-fuel ratio and the lean air-fuel ratio.

According to the present embodiment, when secondary air supplied from the secondary air supply device 25 is regulated in this way, deterioration of exhaust emissions is reduced while facilitating removal of PM deposited on the filter 24.

Specific Control

Figure 5:
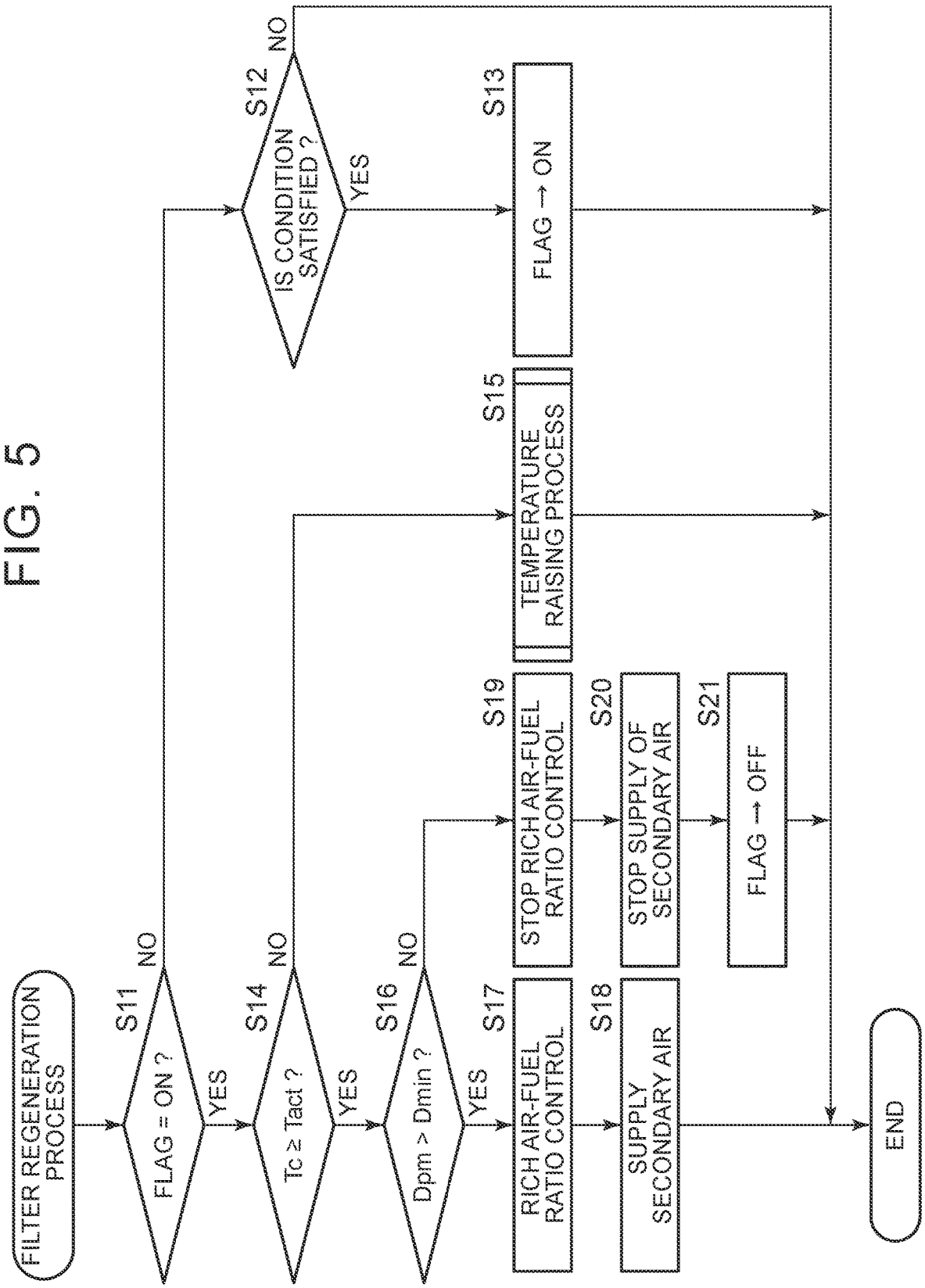
FIG. 5 is a flowchart showing a control routine for the filter regeneration process according to the first embodiment.

Next, specific control in the filter regeneration process according to the present embodiment will be described with reference to FIG. 5. FIG. 5 is a flowchart showing the control routine of the filter regeneration process according to the present embodiment. The illustrated control routine is executed at set time intervals.

First, in step S11, it is determined whether a regeneration flag is in an on state. The regeneration flag is set to the on state when filter regeneration is being performed; otherwise, the regeneration flag is set to an off state. When it is determined in step S11 that the regeneration flag is in the off state, the process proceeds to step S12.

In step S12, it is determined whether a condition for performing the process of regenerating the filter 24 is satisfied. The condition for performing the regeneration process is satisfied, for example, when the amount of PM deposited on the filter 24 is greater than the limit deposition amount. Specifically, when the differential pressure between the upstream side and downstream side of the filter 24, detected by the differential pressure sensor 48, is greater than a limit differential pressure, it is determined that the amount of PM deposited on the filter 24 is greater than the limit deposition amount. On the other hand, when the differential pressure between the upstream side and downstream side of the filter 24, detected by the differential pressure sensor 48, is less than or equal to the limit differential pressure, it is determined that the amount of PM deposited on the filter 24 is less than or equal to the limit deposition amount. The amount of PM deposited on the filter 24 may be detected or estimated by other methods without using the differential pressure sensor 48.

When it is determined in step S12 that the condition for performing the regeneration process is not satisfied, the control routine is ended. On the other hand, when it is determined in step S12 that the condition for performing the regeneration process is satisfied, the process proceeds to step S13. In step S13, the regeneration flag is set to the on state, and the control routine is ended.

When the regeneration flag is set to the on state, the process proceeds from step S11 to step S14 in the next control routine. In step S14, it is determined whether a temperature Tc of the exhaust gas control catalyst 20 is higher than or equal to an activation temperature Tact (for example, 300° C.). The temperature of the exhaust gas control catalyst 20 is detected by the catalyst temperature sensor 46 provided in the exhaust gas control catalyst 20.

As described above, when the temperature Tc of the exhaust gas control catalyst 20 is lower than the activation temperature Tact, hydrogen or ammonia cannot be produced in the exhaust gas control catalyst 20. Therefore, when it is determined in step S14 that the temperature of the exhaust gas control catalyst 20 is lower than the activation temperature Tact, the process proceeds to step S15, and the process of raising the temperature of the exhaust gas control catalyst 20 is performed. Examples of the process of raising the temperature of the exhaust gas control catalyst 20 include dither control in which the air-fuel ratio of air-fuel mixture that is supplied to the combustion chamber 5 is set to the rich air-fuel ratio in part of the plurality of cylinders and the air-fuel ratio of air-fuel mixture that is supplied to the combustion chambers 5 of the remaining cylinders is set to the lean air-fuel ratio. Through the dither control, exhaust gas containing unburnt HC and CO emitted from the cylinders of the rich air-fuel ratio and exhaust gas containing a large amount of oxygen emitted from the cylinders of the lean air-fuel ratio mix with each other and react with each other on the exhaust gas control catalyst 20. For this reason, the temperature of the exhaust gas control catalyst 20 is raised by the use of heat of the reaction at this time. In the process of raising the temperature of the exhaust gas control catalyst 20, existing temperature raising control other than dither control may be used instead of dither control.

When the temperature Tc of the exhaust gas control catalyst 20 rises to the activation temperature Tact or higher as a result of the process of raising the temperature of the exhaust gas control catalyst 20, the process proceeds from step S14 to step S16 in the next control routine. In step S16, it is determined whether the current amount Dpm of PM deposited on the filter 24 is greater than a minimum allowable value Dmin. The minimum allowable value Dmin is a predetermined constant value close to zero. As described above, the amount Dpm of PM deposited on the filter 24 is estimated based on the differential pressure between the upstream side and downstream side of the filter 24, detected by the differential pressure sensor 48 as described above.

When it is determined in step S16 that the amount of PM deposited on the filter 24 is greater than the minimum allowable value Dmin, the process proceeds to step S17. In step S17, rich air-fuel ratio control for regulating the fuel injection amount from each fuel injection valve 11 is executed such that the air-fuel ratio of exhaust gas emitted from the engine body 1 becomes the rich air-fuel ratio. A target air-fuel ratio at this time is set to, for example, 13.6.

Subsequently, in step S18, secondary air is intermittently supplied by the secondary air supply device 25. The period and amount of supply of secondary air are set such that the air-fuel ratio of exhaust gas flowing into the filter 24 varies as shown in FIG. 4. Thus, PM deposited on the filter 24 gradually reduces.

After that, when the amount Dpm of PM deposited on the filter 24 reduces and becomes less than or equal to the minimum allowable value Dmin, the process proceeds from step S16 to step S19 in the next control routine. In step S19, rich air-fuel ratio control is stopped, and the air-fuel ratio of exhaust gas that is emitted from the engine body 1 is set to an air-fuel ratio during normal operation (for example, the air-fuel ratio is kept around the stoichiometric air-fuel ratio). Subsequently, in step S20, supply of secondary air from the secondary air supply device 25 is stopped. Subsequently, in step S21, the regeneration flag is set to the off state, and the control routine is ended.

Alternative Embodiment

Next, an alternative embodiment to the first embodiment will be described with reference to FIG. 6. In the first embodiment, the filter regeneration process is performed while a vehicle equipped with an internal combustion engine is being driven. However, the filter regeneration process may be performed at a maintenance shop or another place.

In this case, the vehicle is provided with an alarm lamp (not shown) that alarms a driver that the filter regeneration process is required, and the alarm lamp is connected to the output port of the ECU 31 via the driving circuit 45. The alarm lamp lights up when the differential pressure between the upstream side and downstream side of the filter 24, detected by the differential pressure sensor 48, becomes greater than the limit differential pressure. When the alarm lamp lights up, the driver drives the vehicle to a maintenance shop.

In this case, the exhaust gas control apparatus for an internal combustion engine does not need to include the secondary air supply device 25 when the exhaust pipe 22 has an opening (not shown) for attaching a secondary air supply device. At the maintenance shop, a cover attached to the opening of the exhaust pipe 22 is detached, the secondary air supply device is attached to this opening, and the secondary air supply device is electrically connected to the output port of the ECU. After that, the filter regeneration process is performed.

Figure 6:
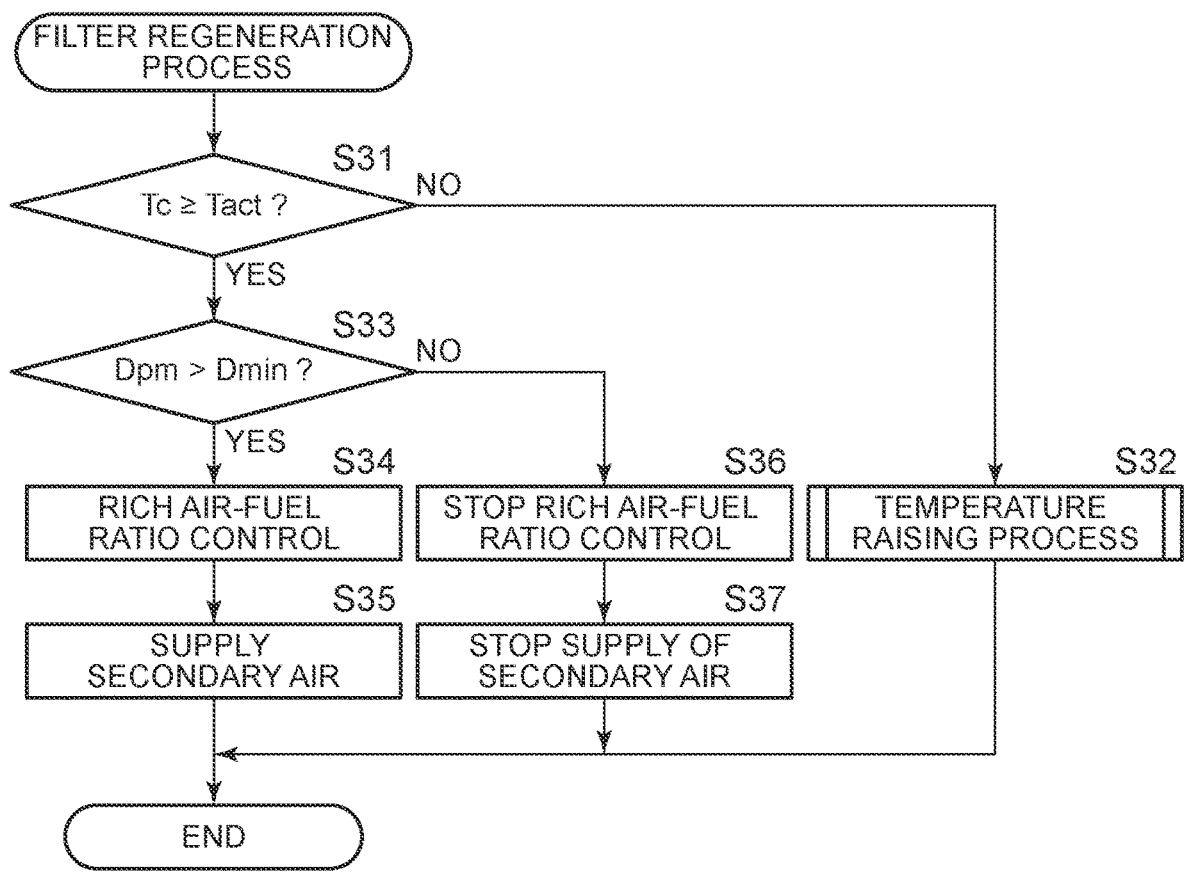
FIG. 6 is a flowchart showing a control routine for a filter regeneration process according to an alternative embodiment to the first embodiment.

FIG. 6 is a flowchart showing the control routine of the filter regeneration process according to the present alternative embodiment. The illustrated control routine is executed at set time intervals after the secondary air supply device 25 is attached.

First, it is determined in step S31 whether the temperature Tc of the exhaust gas control catalyst 20 is higher than or equal to the activation temperature Tact. When the temperature Tc is lower than the activation temperature Tact, the process proceeds to step S32, and the process of raising the temperature of the exhaust gas control catalyst 20 is performed. It is conceivable that the process of raising the temperature of the exhaust gas control catalyst 20 is, for example, attaching an electric heater around the exhaust gas control catalyst 20 and then supplying electric power to the electric heater.

After that, when the temperature Tc of the exhaust gas control catalyst 20 rises to the activation temperature Tact or higher, the process proceeds from step S31 to step S33 in the next control routine. Step S33 to step S37 are basically similar to step S16 to step S20 of FIG. 5, so the description thereof is omitted.

Second Embodiment

Next, an exhaust gas control apparatus for an internal combustion engine according to a second embodiment will be described with reference to FIG. 7. The configuration and control of the exhaust gas control apparatus according to the second embodiment are basically similar to the configuration and control of the exhaust gas control apparatus according to the first embodiment, so portions different from the exhaust gas control apparatus according to the first embodiment will be mainly described below.

Incidentally, where a leanness degree at the time when the air-fuel ratio of exhaust gas flowing into the filter 24 is the leanest is referred to as amplitude when secondary air is being intermittently supplied, the amount of PM that is removed per unit time in the filter regeneration process (PM removal amount) varies with the amplitude. This will be described with reference to FIG. 7.

Figure 7:
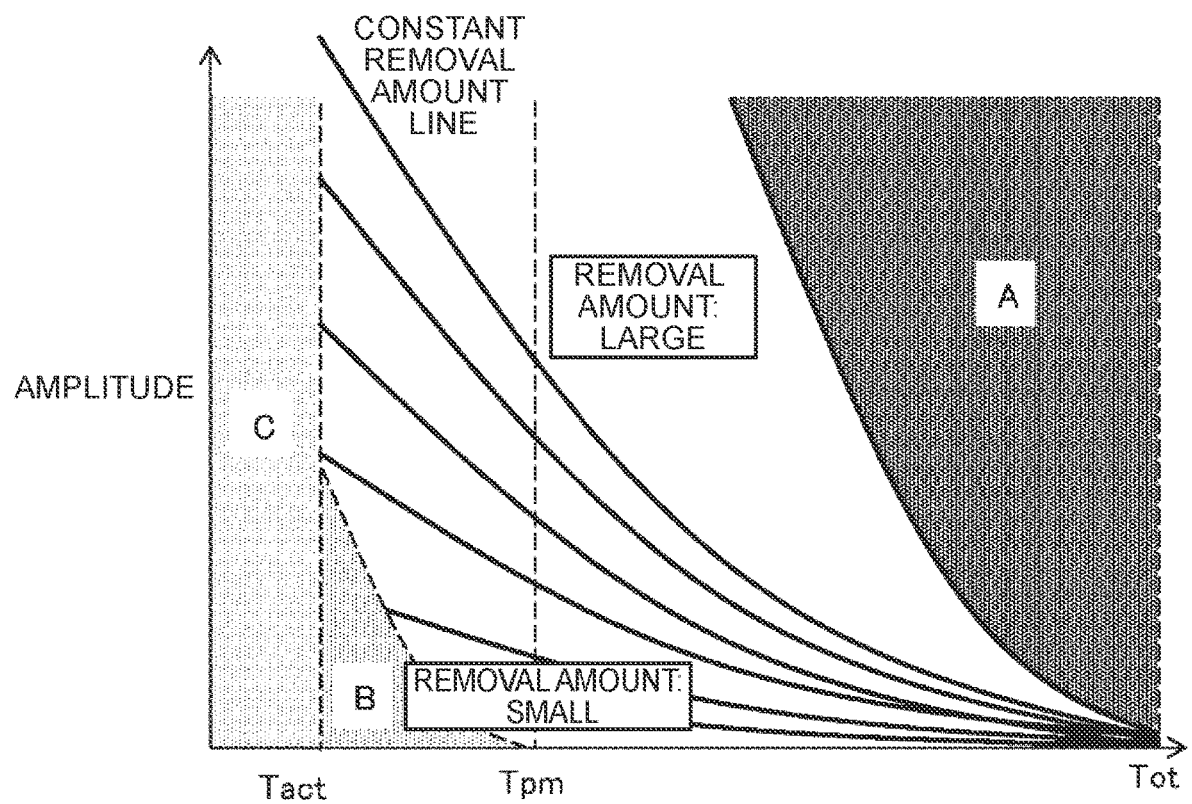
FIG. 7 is a graph showing the relationship between a temperature of the filter and an amplitude.

FIG. 7 is a graph showing the relationship between an amplitude and a temperature of the filter 24. In the graph, Tact denotes the activation temperature (for example, 300° C.) of the filter 24, Tpm denotes a lowest temperature (for example, 500° C.) at or above which PM can be removed by the use of oxygen, and Tot denotes a limit temperature (for example, 950° C.) at or above which the filter 24 breaks because of melting, or the like.

The plurality of solid lines in the graph represent equal removal amount lines on each of which the PM removal amount is equal. Among the plurality of solid lines, the solid line located on the upper side represents the equal removal amount line for a greater PM removal amount. Therefore, as is apparent from FIG. 7, when the temperature of the filter 24 is constant, the PM removal amount increases as the amplitude increases. When the amplitude is constant, the PM removal amount increases as the temperature of the filter 24 rises. As the temperature of the filter 24 rises, the same amount of PM can be removed by a smaller amplitude.

The region A in the graph represents a region as follows. When the filter regeneration process is continued in a state within the region, the temperature of the filter 24 finally becomes higher than or equal to the limit temperature Tot. Therefore, when the filter regeneration process is performed, the amplitude needs to be regulated so as not to become the state within the region A.

Even when the temperature of the filter 24 is lower than the lowest temperature Tpm, exhaust gas having the rich air-fuel ratio and exhaust gas having the lean air-fuel ratio alternately flow into the filter 24 through the filter regeneration process. With this, unburnt HC and CO contained in exhaust gas react with oxygen. Because of the heat of reaction, the temperature of the filter 24 rises to the lowest temperature Tpm or higher. The region B in the graph represents a region as follows. Even when the filter regeneration process is continued in a state within the region, the temperature of the filter 24 does not rise to the lowest temperature Tpm or higher. In addition, the region C in the graph represents a region as follows. Even when the filter regeneration process is continued in a state within the region, no reaction of unburnt HC and CO with oxygen occurs on the filter 24, so the temperature of the filter 24 does not rise to the activation temperature Tact or higher. Therefore, when the filter regeneration process is performed, the amplitude needs to be regulated such that the state does not fall within the region B or the region C.

Figure 8:
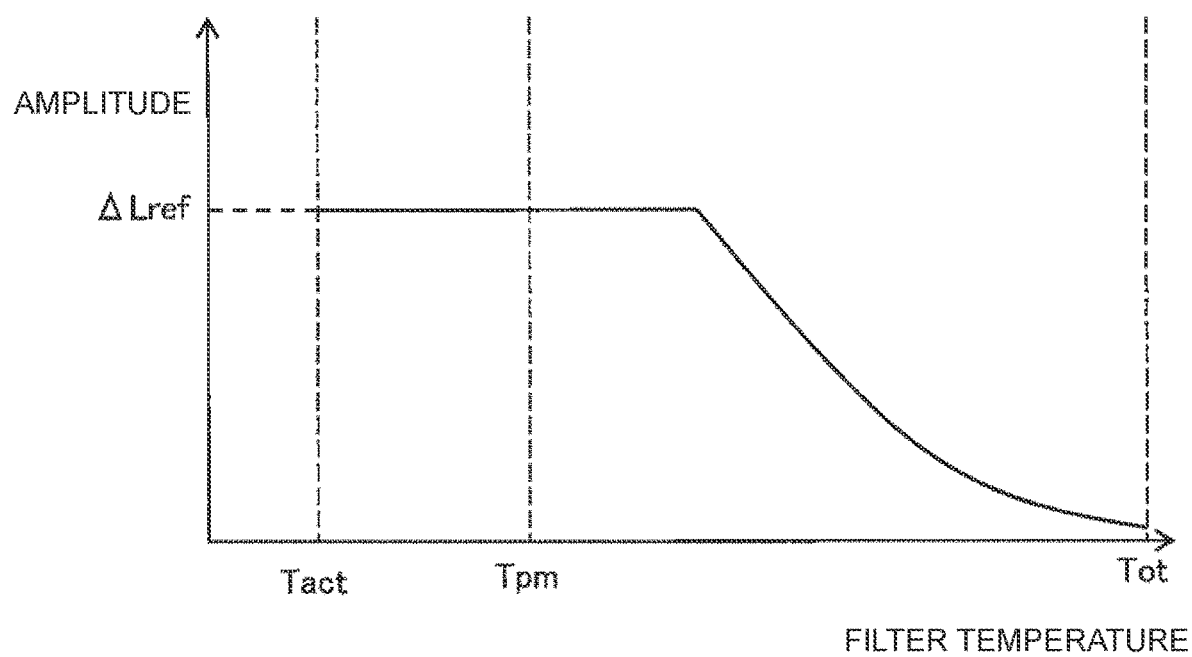
FIG. 8 is a graph showing the relationship between the temperature of the filter and an amplitude.

In the present embodiment, the leanness degree (amplitude) at the time when the air-fuel ratio of exhaust gas flowing into the filter 24 is the leanest is varied with the temperature of the filter 24. FIG. 8 is a graph showing the relationship between a temperature of the filter 24 and an amplitude. As shown in FIG. 8, in the present embodiment, basically, as the temperature of the filter 24 decreases, the amplitude is increased. Thus, while the PM removal amount per unit time is kept at a large amount, an excessive increase in the temperature of the filter 24 is inhibited.

If the amplitude is excessively increased, when the final average air-fuel ratio is intended to be set to almost the stoichiometric air-fuel ratio, the richness degree at the time when the air-fuel ratio of exhaust gas flowing into the filter 24 is the richest needs to be increased. However, if the air-fuel ratio of air-fuel mixture that is supplied to each combustion chamber 5 is excessively decreased, it leads to deterioration of combustion, so the richness degree cannot be increased so much.

In the case where the richness degree at the time when the air-fuel ratio of exhaust gas flowing into the filter 24 is the richest is not varied, if the amplitude is excessively increased, the duration during which the air-fuel ratio of exhaust gas flowing into the filter 24 is the rich air-fuel ratio needs to be excessively extended when the final average air-fuel ratio is intended to be set to almost the stoichiometric air-fuel ratio. However, if the duration is excessively extended so much, exhaust gas having the rich air-fuel ratio and exhaust gas having the lean air-fuel ratio do not mix with each other in the filter 24.

For the above reasons, in the present embodiment, as shown in FIG. 8, the amplitude is increased with a decrease in the temperature of the filter 24, and, when the amplitude reaches a predetermined amplitude ΔLref, the amplitude is kept at the predetermined amplitude ΔLref in the range in which the temperature of the filter 24 is lower than the temperature at the predetermined amplitude ΔLref.

Figure 9:
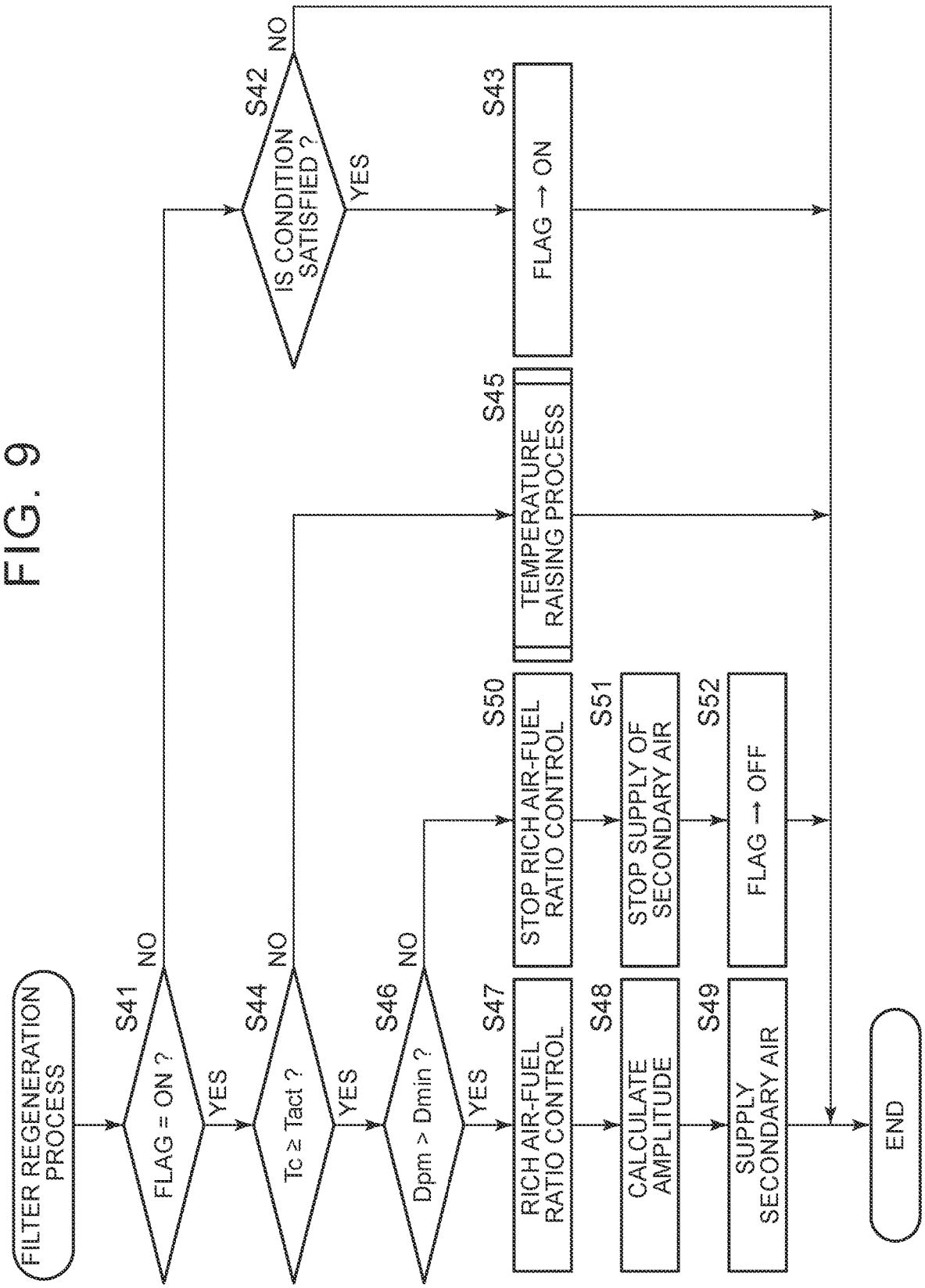
FIG. 9 is a flowchart showing a control routine for a filter regeneration process according to a second embodiment.

FIG. 9 is a flowchart showing the control routine of the filter regeneration process according to the present embodiment. The illustrated control routine is executed at set time intervals. Step S41 to step S47 in FIG. 9 are similar to step S11 to step S17 in FIG. 5, and step S49 to step S52 in FIG. 9 are similar to step S18 to step S21 in FIG. 5, so the description thereof is omitted.

When rich air-fuel ratio control is executed in step S47, a target value of the amplitude is subsequently calculated in step S48. A target value of the amplitude is, for example, calculated based on the temperature of the filter 24, detected by the filter temperature sensor 47, by consulting a map as shown in FIG. 8. Subsequently, in step S49, secondary air is intermittently supplied by the secondary air supply device 25 such that the amplitude becomes the target value calculated in step S48. When the richness degree of the air-fuel ratio of exhaust gas that is emitted from the engine body 1 is varied with the amplitude, the fuel injection amount that is injected from each fuel injection valve 11 is also regulated for the amplitude calculated in step S48.

What is claimed is:

1. An exhaust gas control apparatus for an internal combustion engine, the exhaust gas control apparatus comprising:
    an exhaust gas control catalyst disposed in an exhaust passage of the internal combustion engine, the exhaust gas control catalyst having a catalytic function;
    a particulate filter disposed in the exhaust passage at a location downstream of the exhaust gas control catalyst in an exhaust gas flow direction;
    an oxygen supply device configured to supply gas containing oxygen into exhaust gas flowing into the particulate filter at a location downstream of the exhaust gas control catalyst in the exhaust gas flow direction; and
    an electronic control unit configured to regulate an amount of oxygen that is supplied from the oxygen supply device,
    when a temperature of the exhaust gas control catalyst falls within a predetermined temperature range higher than or equal to an activation temperature and an air-fuel ratio of exhaust gas emitted from a body of the internal combustion engine is a rich air-fuel ratio richer than a stoichiometric air-fuel ratio, the electronic control unit being configured to cause the oxygen supply device to supply oxygen into the exhaust gas while periodically increasing or reducing the oxygen such that an air-fuel ratio of exhaust gas flowing into the particulate filter alternately varies between the rich air-fuel ratio and a lean air-fuel ratio leaner than the stoichiometric air-fuel ratio.

2. The exhaust gas control apparatus according to claim 1, wherein the predetermined temperature range is higher than or equal to 400° C. and lower than or equal to 600° C.

3. The exhaust gas control apparatus according to claim 1, wherein the electronic control unit is configured to cause the oxygen supply device to supply oxygen into the exhaust gas while periodically increasing or reducing the oxygen such that an average air-fuel ratio in a plurality of cycles in which the air-fuel ratio of exhaust gas flowing into the particulate filter alternately varies between the rich air-fuel ratio and the lean air-fuel ratio becomes the stoichiometric air-fuel ratio.

4. The exhaust gas control apparatus according to claim 1, wherein the electronic control unit is configured to increase a leanness degree at the time when the air-fuel ratio of exhaust gas flowing into the particulate filter is the leanest as a temperature of the particulate filter decreases.

5. The exhaust gas control apparatus according to claim 1, wherein the electronic control unit is configured to cause the oxygen supply device to supply oxygen into the exhaust gas while periodically increasing or reducing the oxygen such that the air-fuel ratio of exhaust gas flowing into the particulate filter alternately varies between the rich air-fuel ratio and the lean air-fuel ratio with a period shorter than or equal to a period with which exhaust gas having the lean air-fuel ratio flows into the particulate filter before exhaust gas having the rich air-fuel ratio and having flowed into the particulate filter flows out from the particulate filter and exhaust gas having the rich air-fuel ratio flows into the particulate filter before exhaust gas having the lean air-fuel ratio and having flowed into the particulate filter flows out from the particulate filter.

6. The exhaust gas control apparatus according to claim 1, wherein the particulate filter has a catalytic function.

7. An exhaust gas control apparatus for an internal combustion engine, the exhaust gas control apparatus comprising:

an exhaust gas control catalyst disposed in an exhaust passage of the internal combustion engine, the exhaust gas control catalyst having a catalytic function;

a particulate filter disposed in the exhaust passage at a location downstream of the exhaust gas control catalyst in an exhaust gas flow direction;

an oxygen supply device configured to supply gas containing oxygen into exhaust gas flowing into the particulate filter at a location downstream of the exhaust gas control catalyst in the exhaust gas flow direction; and an electronic control unit configured to regulate an amount of oxygen that is supplied from the oxygen supply device, under a condition that hydrogen or ammonia is produced in the exhaust gas control catalyst when an air-fuel ratio of exhaust gas emitted from a body of the internal combustion engine is a rich air-fuel ratio richer than a stoichiometric air-fuel ratio, the electronic control unit being configured to cause the oxygen supply device to supply oxygen into the exhaust gas while periodically increasing or reducing the oxygen such that an air-fuel ratio of exhaust gas flowing into the particulate filter alternately varies between the rich air-fuel ratio and a lean air-fuel ratio leaner than the stoichiometric air-fuel ratio.

8. The exhaust gas control apparatus according to claim 7, wherein the electronic control unit is configured to cause the oxygen supply device to supply oxygen into the exhaust gas while periodically increasing or reducing the oxygen such that an average air-fuel ratio in a plurality of cycles in which the air-fuel ratio of exhaust gas flowing into the particulate filter alternately varies between the rich air-fuel ratio and the lean air-fuel ratio becomes the stoichiometric air-fuel ratio.

9. The exhaust gas control apparatus according to claim 7, wherein the electronic control unit is configured to increase a leanness degree at the time when the air-fuel ratio of exhaust gas flowing into the particulate filter is the leanest as a temperature of the particulate filter decreases.

10. The exhaust gas control apparatus according to claim 7, wherein the electronic control unit is configured to cause the oxygen supply device to supply oxygen into the exhaust gas while periodically increasing or reducing the oxygen such that the air-fuel ratio of exhaust gas flowing into the particulate filter alternately varies between the rich air-fuel ratio and the lean air-fuel ratio with a period shorter than or equal to a period with which exhaust gas having the lean air-fuel ratio flows into the particulate filter before exhaust gas having the rich air-fuel ratio and having flowed into the particulate filter flows out from the particulate filter and exhaust gas having the rich air-fuel ratio flows into the particulate filter before exhaust gas having the lean air-fuel ratio and having flowed into the particulate filter flows out from the particulate filter.

11. The exhaust gas control apparatus according to claim 7, wherein the particulate filter has a catalytic function.

12. An exhaust gas control apparatus for an internal combustion engine, the exhaust gas control apparatus comprising:

a particulate filter disposed in an exhaust passage of the internal combustion engine;

an oxygen supply device configured to supply gas containing oxygen into exhaust gas flowing into the particulate filter; and an electronic control unit configured to control an amount of oxygen that is supplied from the oxygen supply device, under a condition that $NO_2$ is produced with oxygen supplied from the oxygen supply device when oxygen that is supplied from the oxygen supply device into exhaust gas is periodically increased or reduced such that an air-fuel ratio of exhaust gas flowing into the particulate filter alternately varies between a rich air-fuel ratio richer than a stoichiometric air-fuel ratio and a lean air-fuel ratio leaner than the stoichiometric air-fuel ratio, the electronic control unit being configured to cause the oxygen supply device to supply oxygen into the exhaust gas while periodically increasing or reducing the oxygen such that an air-fuel ratio of exhaust gas flowing into the particulate filter alternately varies between the rich air-fuel ratio and the lean air-fuel ratio.

13. The exhaust gas control apparatus according to claim 12, wherein the electronic control unit is configured to cause the oxygen supply device to supply oxygen into the exhaust gas while periodically increasing or reducing the oxygen such that an average air-fuel ratio in a plurality of cycles in which the air-fuel ratio of exhaust gas flowing into the particulate filter alternately varies between the rich air-fuel ratio and the lean air-fuel ratio becomes the stoichiometric air-fuel ratio.

14. The exhaust gas control apparatus according to claim 12, wherein the electronic control unit is configured to increase a leanness degree at the time when the air-fuel ratio of exhaust gas flowing into the particulate filter is the leanest as a temperature of the particulate filter decreases.

15. The exhaust gas control apparatus according to claim 12, wherein the electronic control unit is configured to cause the oxygen supply device to supply oxygen into the exhaust gas while periodically increasing or reducing the oxygen such that the air-fuel ratio of exhaust gas flowing into the particulate filter alternately varies between the rich air-fuel ratio and the lean air-fuel ratio with a period shorter than or equal to a period with which exhaust gas having the lean air-fuel ratio flows into the particulate filter before exhaust gas having the rich air-fuel ratio and having flowed into the particulate filter flows out from the particulate filter and exhaust gas having the rich air-fuel ratio flows into the particulate filter before exhaust gas having the lean air-fuel ratio and having flowed into the particulate filter flows out from the particulate filter.

16. The exhaust gas control apparatus according to claim 12, wherein the particulate filter has a catalytic function.

* * * * *